(12) United States Patent
Namikawa (10) Patent No.: US 8,827,464 B2
(45) Date of Patent: Sep. 9, 2014

(54) PROJECTION DISPLAY DEVICE, PORTABLE ELECTRONIC APPARATUS AND DIGITAL CAMERA

(75) Inventor: Aiko Namikawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 94 days.

(21) Appl. No.: 13/398,830

(22) Filed: Feb. 16, 2012

(65) Prior Publication Data

US 2012/0218522 A1    Aug. 30, 2012

(30) Foreign Application Priority Data

Feb. 17, 2011    (JP) .................................. 2011-032292
Jan. 10, 2012    (JP) .................................. 2012-001949

(51) Int. Cl.
G03B 21/28    (2006.01)

(52) U.S. Cl.
USPC .................. 353/81; 353/30; 353/33; 353/37; 353/38; 353/99; 349/7; 349/201; 359/224.1; 359/292

(58) Field of Classification Search
USPC ........... 353/20, 30, 31, 33, 37, 38, 81, 94, 98, 353/99; 348/743–747, 771, E5.137, 348/E5.142, E9.027; 359/224.1, 291, 292, 359/629, 634, 640, 649, 771; 349/5, 7–9, 349/84, 95, 201
See application file for complete search history.

(56) References Cited

U.S. PATENT DOCUMENTS

| | | | |
|---|---|---|---|
| 6,507,434 B2 * | 1/2003 | Miyashita ...................... 359/387 |
| 6,556,256 B1 | 4/2003 | Kato et al. | |
| 6,786,604 B2 * | 9/2004 | Aastuen et al. .................. 353/20 |
| 7,232,223 B2 * | 6/2007 | Koide ............................. 353/20 |
| 7,673,993 B2 * | 3/2010 | Ma et al. ......................... 353/20 |
| 8,136,947 B2 * | 3/2012 | Phillips, III ..................... 353/20 |
| 8,351,122 B2 * | 1/2013 | Teijido et al. ................. 359/629 |
| 2005/0036118 A1 | 2/2005 | Ishikura et al. | |
| 2006/0164600 A1 * | 7/2006 | Morejon et al. ............... 353/31 |
| 2007/0024981 A1 | 2/2007 | Duncan et al. | |
| 2008/0084545 A1 * | 4/2008 | Chen et al. ..................... 353/33 |

FOREIGN PATENT DOCUMENTS

| | | |
|---|---|---|
| JP | 2000-180967 A | 6/2000 |
| JP | 2000-249979 A | 9/2000 |
| JP | 2004-070018 A | 3/2004 |
| JP | 2004-177801 A | 6/2004 |

(Continued)

OTHER PUBLICATIONS

Office Action issued Feb. 5, 2013, in Japanese Patent Application No. JP 2012-001949.

*Primary Examiner* — Sultan Chowdhury (74) *Attorney, Agent, or Firm* — Miles & Stockbridge P.C.

(57) ABSTRACT

A projection display device includes: a light source unit including light sources emitting light in a plurality of colors, condenser lenses and a color combining optical element; a total reflection prism that totally reflects a combined light flux from the color combining optical element so as to be guided to an image forming unit; and a projection lens. At least one of; an entry surface of the color combining optical element through which substantially parallel light fluxes from the condenser lenses enter, an exit surface of the color combining optical element through which the combined light flux exists, and an entry surface of the total reflection prism through which the combined light flux enters, is formed as a free curved surface where a shape of a section of the combined light flux is altered so as to be matched with a shape of an outline of the display area.

9 Claims, 5 Drawing Sheets

(56) References Cited

FOREIGN PATENT DOCUMENTS

| JP | 2004-279498 A | 10/2004 |
| JP | 2005-062530 A | 3/2005 |
| JP | 2007-102095 A | 4/2007 |
| JP | 2009-503585 A | 1/2009 |
| JP | 2009-025514 A | 2/2009 |
| WO | WO 00/73844 A1 | 12/2000 |

* cited by examiner

PROJECTION DISPLAY DEVICE, PORTABLE ELECTRONIC APPARATUS AND DIGITAL CAMERA

INCORPORATION BY REFERENCE

The disclosures of the following priority applications are herein incorporated by reference: Japanese Patent Application No. 2011-32292 filed Feb. 17, 2011 and Japanese Patent Application No. 2012-1949 filed Jan. 10, 2012

BACKGROUND OF THE INVENTION

1. Field of the Invention

The present invention relates to a projection display device, a portable electronic apparatus and a digital camera.

2. Description of Related Art

A projection display device known in the related art may include a micro-mirror device. A micro-mirror device, which is a reflection-type display element with extremely small mirrors arrayed in a two-dimensional pattern, allows the angles of inclination of the various mirrors to be individually controlled. A projection display device equipped with a micro-mirror device such as that disclosed in Japanese Laid Open Patent Publication No. 2005-62530 extracts color light including red light, green light and blue light, through time division via a color wheel, radiates the extracted light onto the micro-mirror device and projects an RGB image formed on the micro-mirror device by projecting the light reflected at the micro-mirror device onto a screen or the like.

SUMMARY OF THE INVENTION

There is an issue yet to be effectively addressed with regard to the structure disclosed in Japanese Laid Open Patent Publication No. 2005-62530 in that the presence of the color wheel and a total reflection prism is bound to increase the size of the device as a whole.

According to the 1st aspect of the present invention, a projection display device comprises: a light source unit including light sources emitting light in a plurality of colors, condenser lenses, via each of which light fluxes emitted from the light sources emitting light in the plurality of colors, are condensed and are output as substantially parallel light fluxes, and a color combining optical element that outputs the substantially parallel light fluxes from the condenser lenses having entered at an entry surface thereof and outputs the substantially parallel light fluxes as a combined light flux through an exit surface thereof; an image forming unit that forms an image in a display area; a total reflection prism that totally reflects the combined light flux having exited the color combining optical element and having entered an entry surface thereof, at a total reflection surface thereof, outputs the combined light flux totally reflected through an exit surface thereof so as to guide the combined light flux totally reflected to the image forming unit and outputs reflected light reflected from the image forming unit through an exit surface thereof; and a projection lens that projects the reflected light output from the total reflection prism onto a projection surface. At least one of; the entry surface of the color combining optical element through which the substantially parallel light fluxes from the condenser lenses enter, the exit surface of the color combining optical element through which the combined light flux exists, and the entry surface of the total reflection prism through which the combined light flux from the color combining optical element enters, is formed as a free curved surface where a shape of a section of the combined light flux is altered so as to match the shape of the section of the combined light flux having been guided to the image forming unit, about to enter the display area, with a shape of an outline of the display area into which the combined light flux enters.

According to the 2nd aspect of the present invention, in the projection display device according to the 1st aspect, it is preferred that the exit surface of the total reflection prism, through which the reflected light from the image forming unit is output, is an aspherical surface.

According to the 3rd aspect of the present invention, in the projection display device according to the 1st aspect, it is preferred that the light source unit is disposed so that an exiting light axis of the combined light flux output from the color combining optical element tilts by a predetermined angle relative to the display area of the image forming unit; and a smaller apex angle is formed by the exit surface of the total reflection prism, through which the combined light flux, having been totally reflected at the total reflection surface and guided toward the image forming unit exits, and the total reflection surface compared to an apex angle formed when the exiting light axis runs parallel to the display area of the image forming unit.

According to the 4th aspect of the present invention, in the projection display device according to the 3rd aspect, it is preferred that the predetermined angle is set within a range between 10° and 11° and the apex angle is set within a range between 31.5° and 32.5°.

According to the 5th aspect of the present invention, in the projection display device according to the 4th aspect, it is preferred that the predetermined angle is 10.59° and the apex angle is 32°.

According to the 6th aspect of the present invention, in the projection display device according to the 1st aspect, it is preferred that the light sources emitting light in the plurality of colors are light sources that emit light in three different colors; the image forming unit is a micro-mirror device; and the entry surface of the total reflection prism is the free curved surface.

According to the 7th aspect of the present invention, a portable electronic apparatus comprises a projection display device according to the 1st aspect.

According to the 8th aspect of the present invention, a digital camera comprises a projection display device according to the 1st aspect.

DESCRIPTION OF PREFERRED EMBODIMENTS

First Embodiment

Figure 1:
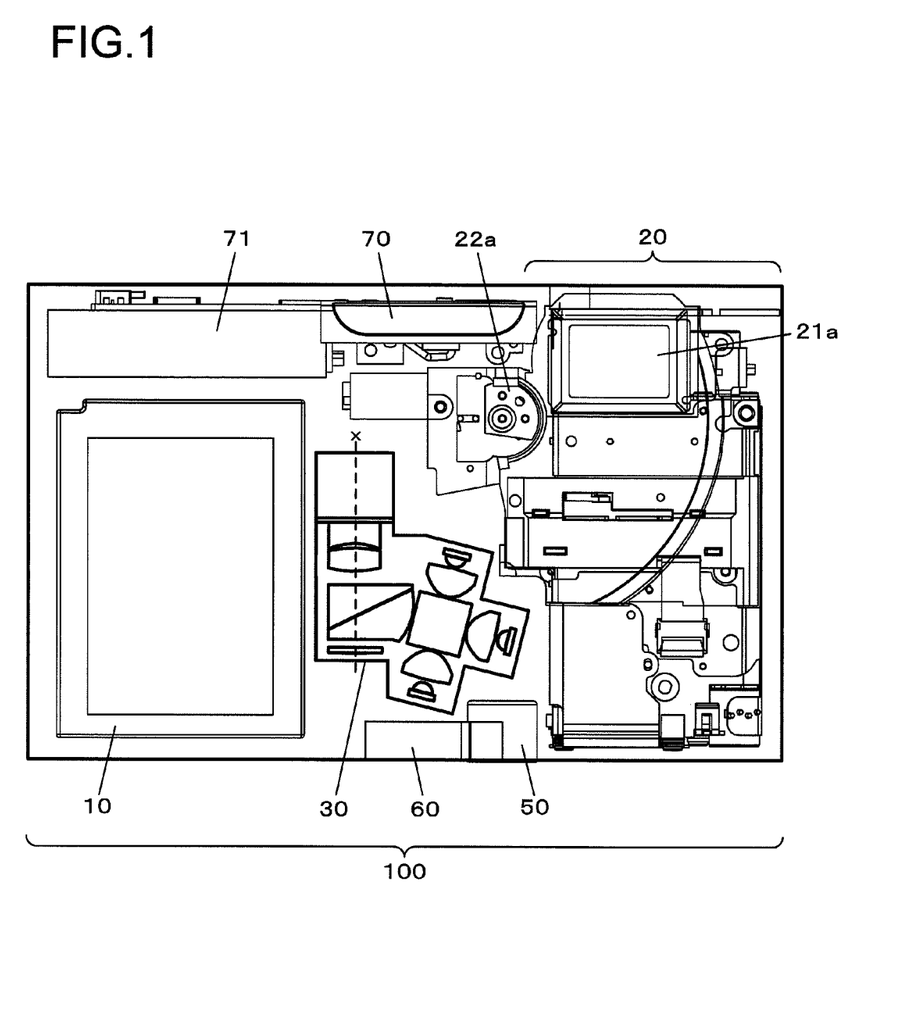
FIG. 1 shows the internal structure of a digital camera with a built-in projector achieved in a first embodiment in a view taken from the front side.

FIG. 1 shows the internal structure adopted in a camera body 100 of the digital camera with a built-in projector achieved in the first embodiment in a view taken from the front side. The camera body 100 appears to assume a substantially rectangular shape when viewed from the front. Inside the camera body 100, a battery chamber 10 and a camera unit 20 are disposed respectively on the left side and on the right side, with a projector module 30 disposed between the battery chamber 10 and the camera unit 20. A power source battery is loaded through, for instance, the bottom of the camera body 100 into the battery chamber 10.

The camera unit 20 includes a bending photographic optical system, a lens barrier, an image capturing portion and the like. The photographic optical system includes, as built-in components, a plurality of lenses, a mirror which is a bending optical system, an optical image blur correction mechanism and the like. A light flux originating from a subject first enters an objective lens 21a which is exposed at the front side of the camera body 100, is bent downward by the mirror and is transmitted through the group of lenses before entering the image capturing portion.

The lens barrier, which is driven by a barrier drive portion 22a, may take a closed (protective) position to shield the front surface of the objective lens 21a or an open (retreated) position to expose the objective lens 21a. A control circuit (not shown) executes control so that the barrier drive portion 22a drives the lens barrier from the closed position to the open position in response to a status shift of a power switch into an ON state and that the barrier drive portion 22a drives the lens barrier to the closed position in response to a status shift of the power switch into an Off state.

An image sensor, an optical filter and the like are disposed at the image capturing portion. The light flux having passed through the photographic optical system is received at the image sensor near the bottom of the camera body 100 and undergoes photoelectric conversion at the image sensor. Image data are generated through various types of processing executed on the output from the image sensor resulting from the photoelectric conversion. The image data are then recorded into a memory card (not shown).

A light emitting portion 70, which radiates auxiliary light toward the subject, is disposed near the top of the camera body 100 on its front side. Above the battery chamber 10 inside the camera body 100, a large-capacity capacitor 71, which accumulates an electric charge to be used to enable light emission at the light emitting portion 70, is disposed. In addition, a tripod locking member 50 with a screw hole through which a tripod is to be locked formed therein and a tilt member 60 that projects out of the camera body 100 during projection to enable adjustment of the angle with which the camera body 100 is set are disposed at the bottom of the camera body 100 over its central area.

Description of the Projector Module 30

Figure 2:
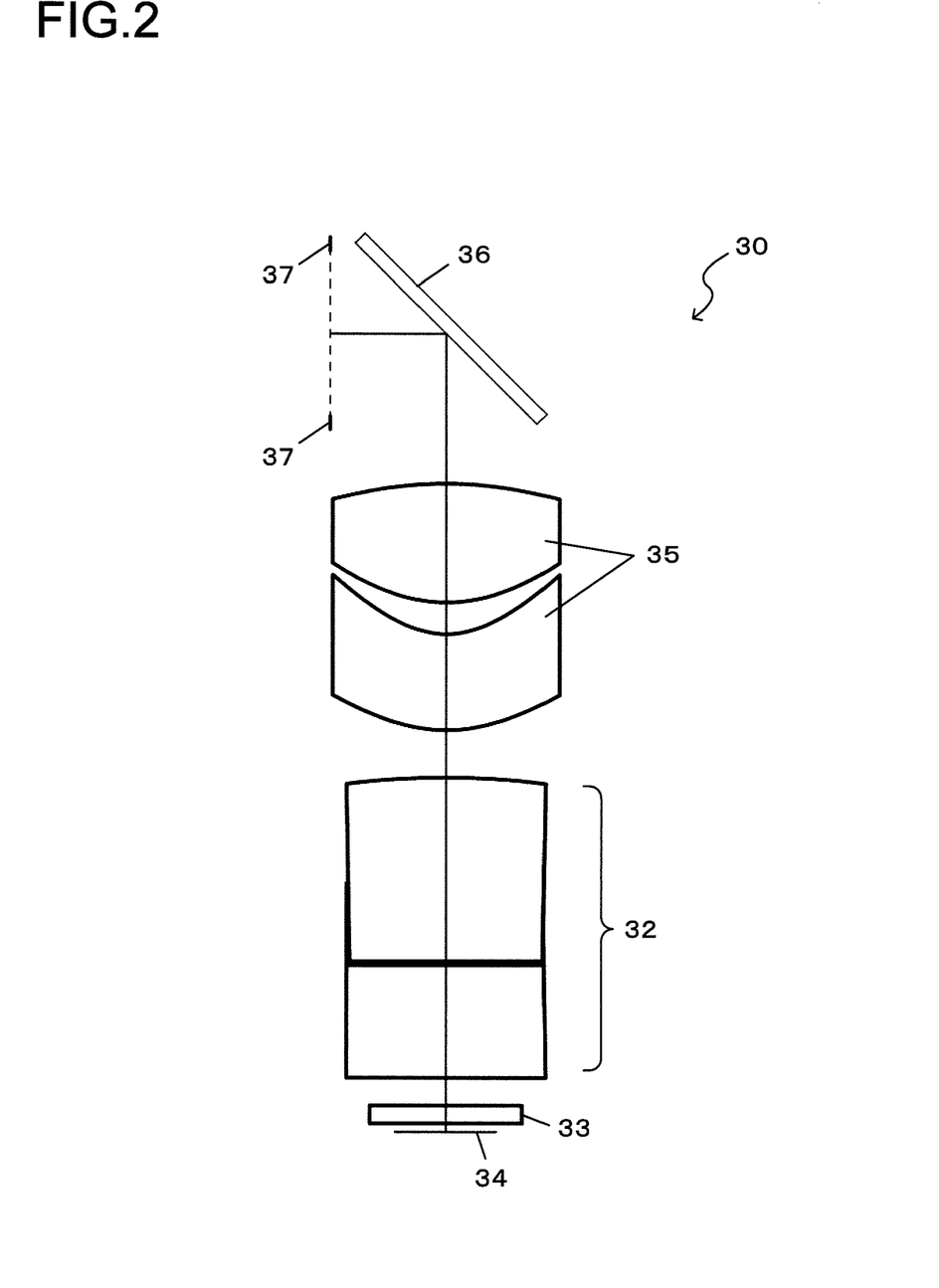
FIG. 2 is a sectional view of the projector module taken through section X in FIG. 1.
Figure 3:
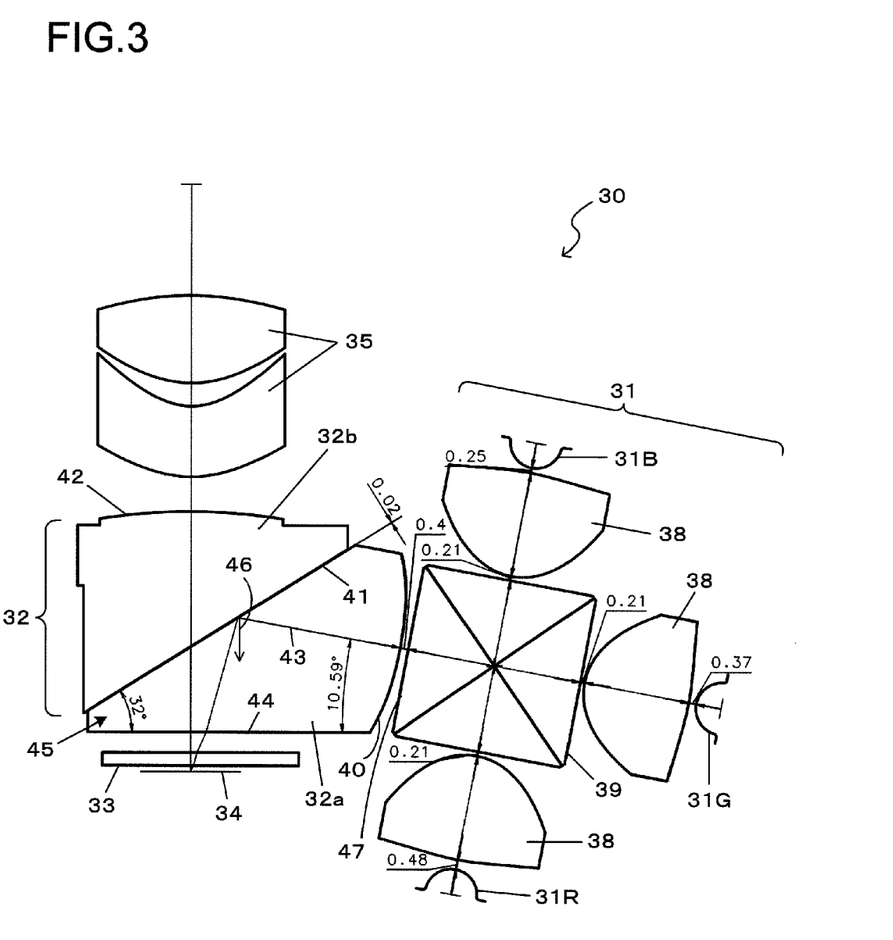
FIG. 3 is a sectional view of the projector module taken from the camera front side.

FIG. 2 is a sectional view of the projector module taken through a section X in FIG. 1. In addition, FIG. 3 is a sectional view of the projector module taken from the camera front side. As shown in FIGS. 2 and 3, the projector module 30 includes a light source unit 31 that emits light in various colors, i.e., red light, green light and blue light, through time division, a total reflection prism 32, a protective member 33, a micro-mirror device 34, a projection lens 35, a mirror 36 and an aperture diaphragm 37.

The light source unit 31 includes three high-luminance LEDs 31R, 31G and 31B which are turned on in time series, condenser lenses 38, each of which condenses light fluxes emitted from one of the high-luminance LEDs and outputs the condensed light fluxes as a substantially parallel light flux and a cross-dichroic prism 39 that directs the substantially parallel light flux toward the total reflection prism 32. The high-luminance LED 31R is a red-color LED that emits red light. While it is desirable to collimate the various light fluxes so as to achieve a completely parallel light flux, the term "substantially parallel light flux" is used above by taking into consideration possible manufacturing error. In addition, the high-luminance LED 31G is a green-color LED, the high-luminance LED 31B is a blue-color LED and they respectively emit green light and blue light. The light fluxes emitted from the individual high-luminance LEDs are condensed at the respective condenser lenses 38 each disposed frontward relative to one of the high-luminance LEDs and are output as substantially parallel light fluxes. The substantially parallel light fluxes thus output constitute a light flux that is radiated onto the micro-mirror device 34 as will be explained later.

It is to be noted that the distances between the three high-luminance LEDs 31R, 31G and 31B and the corresponding condenser lenses 38 are not uniform, with the high-luminance LED 31R and the corresponding condenser lens 38 set apart from each other by 0.48 mm, the high-luminance LED 31G and the corresponding condenser lens 38 set apart from each other by 0.37 mm and the high-luminance LED 31B and the corresponding condenser lens 38 set apart from each other by 0.25 mm, as shown in FIG. 3. Such variance in the distance is assumed in order to ensure that no axial chromatic aberration occurs when light fluxes in the three different colors, i.e., red, blue and green, originating from the individual high-luminance LEDs are projected.

The substantially parallel light fluxes in the three different colors departing the individual condenser lenses 38 are combined through time division at the cross-dichroic prism 39 and the resulting combined light flux is output from the cross-dichroic prism 39 toward the total reflection prism 32. The total reflection prism 32 is formed by pasting a first prism 32a and a second prism 32b together over a 0.02 mm gap. The presence of such a gap makes it possible to form a total reflection surface 41, which is to be described later. A surface 40 of the first prism 32a, located closer to the light source unit 31, via which the substantially parallel light fluxes (combined light flux) output from the light source unit 31 enters, is a free curved surface at which a light flux to enter a display area of the micro-mirror device 34 is formed by condensing the substantially parallel light fluxes and altering the sectional shape of the condensed substantially parallel light flux so as to substantially match the shape of the section of the light flux entering the display area with the shape formed by the outline of the display area at the micro-mirror device 34. While it is desirable to achieve a perfect match for the shape of the outline of the display area and the sectional shape of the light flux entering the display area, the wording "substantially match" is used here by taking into consideration possible manufacturing error. The shape of the outline is normally rectangular, whereas the shape of the section of the substantially parallel light flux, i.e., the combined light flux output from the light source unit 31, is normally circular. Namely, at the free curved surface 40, the circular section of the combined light flux is altered to achieve a rectangular shape so substantially match the outline shape. As described later, the combined light flux output from the cross-dichroic prism 39 is totally reflected at the total reflection prism 32 and the reflected combined light flux is guided toward the display area of the micro-mirror device 34 to enter the display area. A surface 42 of the second prism 32b, located toward the projection lens 35, is an aspherical surface via which any aberration manifesting in the light reflected from the micro-mirror device 34 is corrected as the reflected light from the micro-mirror device 34 exits the surface 42 of the second prism 32b.

The protective member 33 is a transparent member that protects the display surface of the micro-mirror device 34. The micro-mirror device 34 is a reflection-type display element that includes micro-mirrors arrayed in a two-dimensional pattern. It is to be noted that the first prism 32a and the second prism 32b in the embodiment are each constituted of a resin (e.g., cyclo-olefin polymer) or a glass member with a refractive index of approximately 1.5309. In addition, the cross-dichroic prism 39 is constituted of a resin or a glass member with a refractive index of approximately 1.5187, the protective member 33 is constituted of a resin or a glass member with a refractive index of approximately 1.52 and the condenser lenses 38 are constituted of a resin or a glass member with a refractive index of approximately 1.6231. In addition, the tilt angle of the reflecting surface of each of the mirrors constituting the micro-mirror device 34 can be adjusted to +12° or −12°.

Via the projector module 30 structured as described above, an image corresponding to image data stored in a memory card can be projected on a surface outside the camera body 100. The control circuit in the camera body 100 transmits the projection target image data from the memory card to the micro-mirror device 34 and displays the image corresponding to the image data at the display surface of the micro-mirror device 34. As the high-luminance LEDs 31R, 31G and 31B are sequentially turned on in this state, light fluxes emitted from each of the high-luminance LEDs are collimated via the corresponding condenser lens 38 and thus enter the cross-dichroic prism 39 as a substantially parallel light flux.

The combined light flux achieved by combining the three substantially parallel light fluxes from the three condenser lenses 38 departs the cross-dichroic prism 39 toward the surface 40 of the first prism 32a. This combined light flux, which is also a substantially parallel light flux, enters the total reflection prism 32 via the free curved surface 40, is totally reflected at the total reflection surface 41 and departs the total reflection prism 32 through a surface 44 before it enters the display surface (display area) of the micro-mirror device 34 via the protective member 33. In other words, the combined light flux having departed the cross-dichroic prism 39 is guided via the total reflection prism 32 toward the display area of the micro-mirror device 34 as the combined light flux is totally reflected at the total reflection surface 41 of the total reflection prism 32. The combined light flux guided to the display area of the micro-mirror device 34 enters the display area, light reflected from the display area enters the total reflection prism 32 through the surface 44 and the light having entered the total reflection prism 32 is transmitted through the total reflection surface 41 before exiting the total reflection prism 32 through the aspherical surface 42. Subsequently, as the reflected light travels via the projection lens 35, the mirror 36 and the aperture diaphragm 37, the reflected optical image formed with the reflected light, i.e., the projection target image displayed in the display area of the micro-mirror device 34, is projected onto a projection surface outside the camera. The total reflection surface 41 is the surface of the first prism 32a facing the 0.02 mm gap present between the first prism 32a and the second prism 32b as explained earlier.

This projector module 30 is configured so that it can be installed in a portable electronic apparatus such as the camera body 100 shown in FIG. 1. This means that the projector module 32 must be provided as a compact unit. An exiting light axis 43 in FIG. 3 is the optical axis of the combined light flux output through the cross-dichroic prism 39. The light source unit 31 in the embodiment is disposed so that the exiting light axis 43 tilts at a predetermined angle along the direction indicated by an arrow 46 in FIG. 3 relative to the entry surface (surface 44) of the micro-mirror device 34. While it is desirable that the predetermined angle be approximately 10.59° as indicated in FIG. 3, it may be any angle within the range of 10° through 11° in consideration of possible manufacturing error.

When the exiting light axis 43 of the light exiting the light source unit 30 is tilted as described above, a smaller apex angle 45 is formed by the exit surface (surface 44), through which the light flux having been totally reflected at the total reflection surface 41 exits, and the total reflection surface 41, compared to the apex angle formed by the same surfaces when the exiting light axis 43 extends parallel to the entry surface (surface 44) of the micro-mirror device 34. As a result, the distance between the surface 44 and the surface 42 can be reduced. Namely, the tilt of the exiting light axis 43 relative to the entry surface (surface 44) of the micro-mirror device 34 allows the total reflection prism 32 to assume a smaller size compared to that required when the exiting light axis 43 runs parallel to the entry surface (surface 44) of the micro-mirror device 34. While it is desirable that the apex angle be approximately 32°, as indicated in FIG. 3, it may be any angle within the range of 31.5° through 32.5° in view of possible manufacturing error.

The following advantages are achieved with the digital camera with a built-in projector in the first embodiment described above.

(1) The entry surface 40 of the total reflection prism 32, through which the sequential light originating from the light source unit 31 enters, is formed as a free curved surface where a light flux to enter the display surface of the micro-mirror device 34 is formed by condensing the sequential light from the light source unit 31 and altering the shape of the section of the sequential light so as to substantially match the shape of the section of the light flux to enter the display surface with the shape of the outline of the display surface. As a result, the projector module 30 can be provided as a more compact unit compared to a projector module 30 with condenser lenses disposed between the light source unit 31 and the total reflection prism 32.

(2) The exit surface 42 of the total reflection prism 32, through which the light reflected at the micro-mirror device 34 exits, is formed as an aspherical surface. This means that the projection lens 35 can be configured with fewer lenses compared to the number of lenses constituting a projection lens 35 used to correct aberration manifesting in the reflected optical image formed with the reflected light from the micro-mirror device 34, which, in turn, makes it possible to further miniaturize the projector module 30.

(3) The light source unit 31 is configured with three color high-luminance LEDs 31R, 31G and 31B, which emit light in the three colors, condenser lenses 38, via each of which a light flux in a specific color among the three colors emitted from the high-luminance LEDs, are collimated into a substantially parallel light flux, and a cross-dichroic prism 39 via which the substantially parallel light fluxes in the three colors, each corresponding to one of the high-luminance LEDs 31R, 31G and 31B, are combined and are output as a combined light flux. The shape of the section of the combined light flux can thus be altered at the total reflection prism 32 so as to form a light flux to be radiated onto the micro-mirror device 34. In addition, the light source unit 31 is disposed so that the exiting light axis 43 of the light exiting the light source unit 31 tilts by approximately 10.59° relative to the entry surface 40 of the micro-mirror device 34. Furthermore, a smaller apex angle 45 of approximately 32° is formed by the exit surface 44, through which the light flux having been totally reflected at the total reflection surface 41 exits, and the total reflection surface 41, compared to the apex angle formed when the exiting light axis 43 runs parallel to the entry surface 44 of the micro-mirror device 34. This means that the projector module 30 can be provided as a more compact unit compared to a projector module in the related art that includes a color wheel disposed in the light source unit or a projector module in the related art, in which the exiting light axis 43 runs parallel to the entry surface 44 of the micro-mirror device 34.

(4) In the light source unit 31, the light fluxes emitted from the various high-luminance LEDs are first collimated into substantially parallel light fluxes at the respective condenser lenses 38 and then the optical axes of the substantially parallel light fluxes in three colors are aligned at the cross-dichroic prism 39. As a result, better utilization efficiency is assured with regard to light radiated onto the micro-mirror device 34.

Second Embodiment

While the digital camera with a built-in projector achieved in the second embodiment of the present invention adopts a structure similar to that of the digital camera with a built-in projector achieved in the first embodiment, the free curved surface in the second embodiment is formed at a position different from that of the free curved surface in the first embodiment. The following is a description of the digital camera with a built-in projector achieved in the second embodiment. It is to be noted that in the following description, components similar to those in the first embodiment are notated with the same reference numerals so as to preclude the necessity for a repeated explanation thereof.

Figure 4:
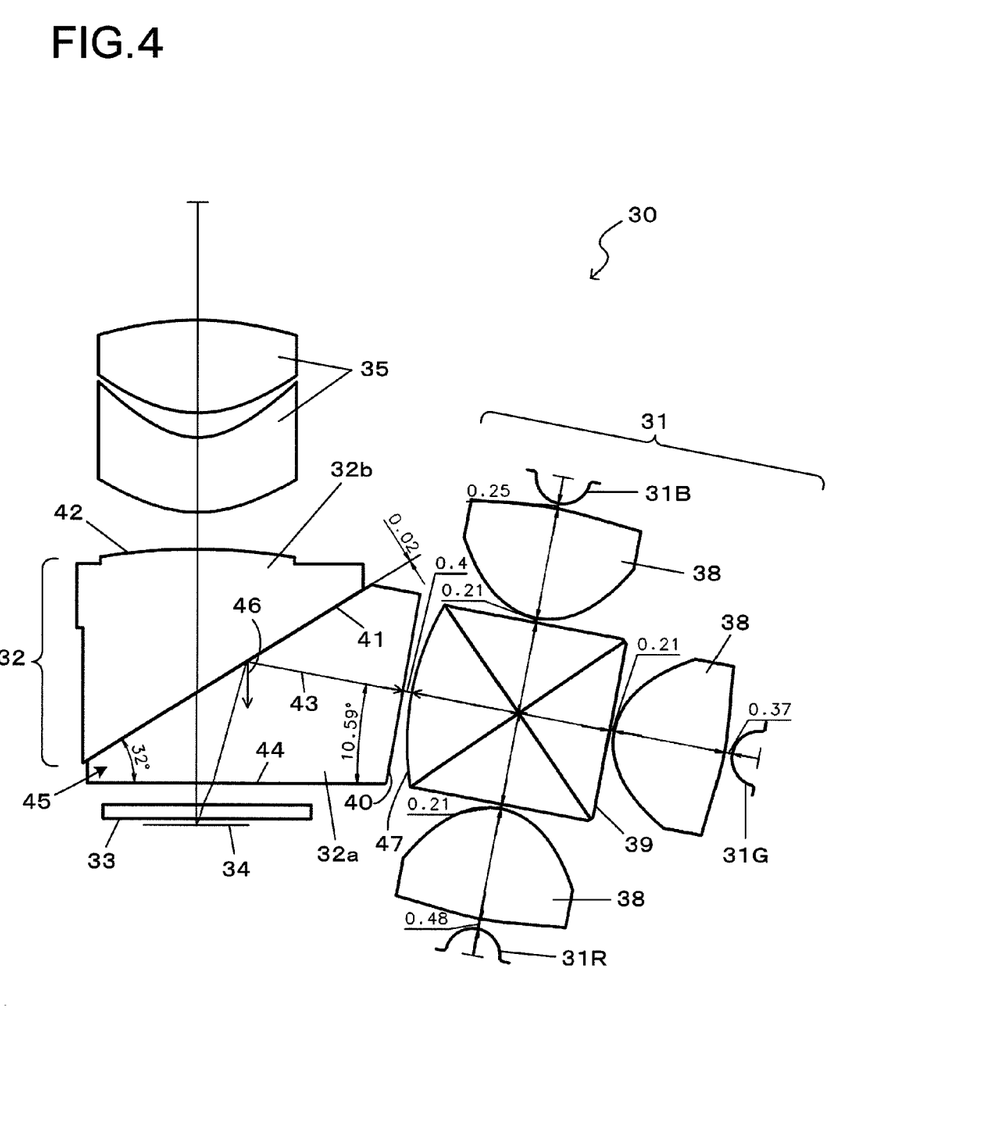
FIG. 4 is a sectional view of a projector module taken from the camera front side.

FIG. 4 is a sectional view of the projector module achieved in the second embodiment, taken from the camera front side. It is distinguishable from the projector module in the first embodiment in that an exit surface 47 of the cross-dichroic prism 39 is a free curved surface and that the entry surface 40 of the first prism 32a facing opposite the exit surface 47 is not a free curved surface. Advantages similar to those of the first embodiment are achieved by forming the exit surface 47 of the cross-dichroic prism 39, instead of the entry surface 40 of the first prism 32a, as a free curved surface where the combined light flux exiting the cross-dichroic prism 39 is condensed and the shape of the section of the combined light flux is altered so as to substantially match the shape of the section of the light flux to enter the display area of the micro-mirror device 34 with the shape of the outline of the display area.

Variations such as those described below are also within the scope of the present invention and one of the variations or a plurality of the variations may be adopted in combination with either of the embodiments described above.

Variation 1

In the first and second embodiments described above, the projector module 30 is mounted in a digital camera. However, the present invention is not limited to this example and it may be adopted in a projector module 30 installed in a portable electronic apparatus other than a digital camera. Alternatively, the present invention may be adopted in a projection display device installed at a fixed position.

Variation 2

The light source unit 31 may include light sources other than high-luminance LEDs. In addition, the light source unit 31 may be configured with high-luminance LEDs that emit light fluxes in four colors or more instead of the three high-luminance LEDs 31R, 31G and 31B that emit light fluxes in three colors, i.e., red, green and blue.

Variation 3

The optical member that aligns the optical axes of the three color light fluxes may be a color combining optical element other than the cross-dichroic prism 39. For instance, an optical element equivalent to the cross-dichroic prism 39 may be configured with mirrors or the like and such an optical element may be used as an alternative to the cross-dichroic prism 39. In addition, an image forming portion other than the micro-mirror device may be utilized. In conjunction with an image forming portion constituted with a color liquid crystal such as LCOS instead of a micro-mirror device, the light source unit 31 may emit white light achieved by mixing the three color light, Variation 4

The numerical values indicating the refractive indices, angles and the like pertaining to the various optical members quoted in the description of the first and second embodiments are examples and numerical values different from those may be assumed.

Variation 5

Figure 5:
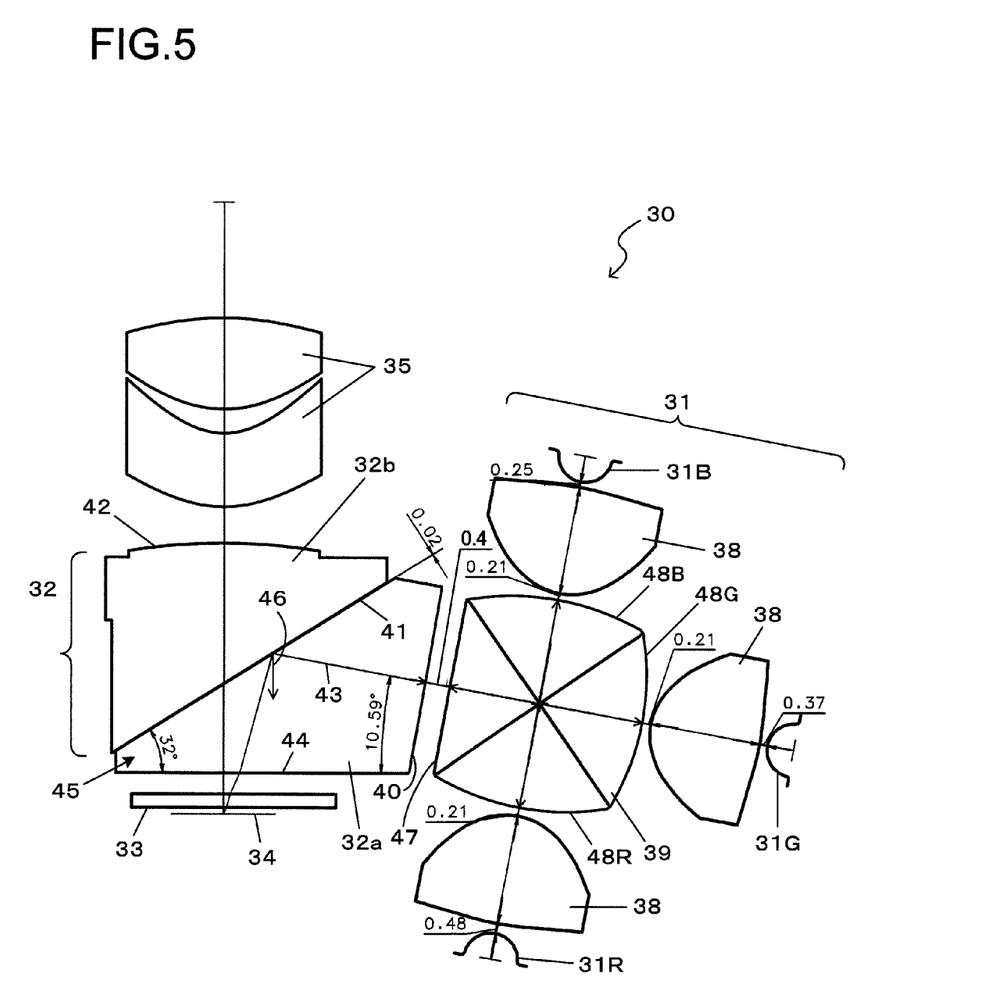
FIG. 5 is a sectional view of a projector module taken from the camera front side.

In the first embodiment, the entry surface 40 of the first prism 32a is formed as a free curved surface. In the second embodiment, the exit surface 47 of the cross-dichroic prism 39 is formed as a free curved surface. As a further alternative shown in FIG. 5, the entry surfaces of the cross-dichroic prism 39, i.e., three surfaces 48R, 48G and 48B respectively facing opposite the high-luminance LEDs 31R, 31G and 31B, may be formed as free curved surfaces. In such a case, the light fluxes in the three colors emitted from the high-luminance LEDs 31R, 31G and 31B are respectively condensed at the three free curved surfaces 48R, 48G and 48B and the shape of the section of the combined light flux achieved by combining the condensed light fluxes are altered via the free curved surfaces 48R, 48G and 48B so as to substantially match the shape of the section of the light flux to enter the display area of the micro-mirror device 34 with the shape of the outline of the display area. Furthermore, the entry surface 40 of the first prism 32a, the exit surface 47 of the cross-dichroic prism 39 and the entry surface of the cross-dichroic prism 39 may all be formed as free curved surfaces, or any two surfaces among these surfaces, e.g. the exit surface 47 of the cross-dichroic prism 39 and the entry surface of the cross-dichroic prism 39, may be formed as free curved surfaces.

As long as the features characterizing the present invention are not compromised, the present invention is not limited to the particulars of the embodiments described above and other embodiments that are conceivable within the technical scope of the present invention are also within the scope of invention.

The above described embodiments are examples and various modifications can be made without departing from the scope of the invention.

What is claimed is:

1. A projection display device, comprising:
    a light source unit including light sources emitting light fluxes in a plurality of colors, condenser lenses, via each of which the light fluxes emitted from the light sources are condensed and are output as substantially parallel light fluxes, and a color combining optical element having a plurality of entry surfaces which the substantially parallel light fluxes respectively enter and an exit surface, combining the substantially parallel light fluxes as a combined light flux and outputting the combined light flux through the exit surface;

an image forming unit that forms an image in a display area thereof;

a total reflection prism that has an entry surface which the combined light flux having been output by the color combining optical element enters, a total reflection surface, a first exit surface and a second exit surface, totally reflects the combined light flux at the total reflection surface, outputs the combined light flux through the first exit surface so as to guide the combined light flux to the display area of the image forming unit after the combined light flux has been totally reflected and outputs reflected light reflected from the image forming unit through the second exit surface; and a projection lens that projects the reflected light output from the total reflection prism onto a projection surface, wherein:

at least one of the plurality of entry surfaces of the color combining optical element, the exit surface of the color combining optical element, and the entry surface of the total reflection prism, is formed as a free curved surface, the free curved surface altering a shape of a section of light flux having entered the free curved surface to a predetermined shape which corresponds to a shape of an outline of the display area.

2. The projection display device according to claim 1, wherein:

the second exit surface of the total reflection prism is an aspherical surface.

3. The projection display device according to claim 1, wherein:

the light source unit is disposed so that an exiting light axis of the combined light flux output from the color combining optical element tilts by a predetermined angle relative to the display area of the image forming unit; and a smaller apex angle is formed by the first exit surface of the total reflection prism and the total reflection surface compared to an apex angle formed when the exiting light axis runs parallel to the display area of the image forming unit.

4. A projection display device, comprising:

a light source unit including light sources emitting light fluxes in a plurality of colors, condenser lenses, via each of which the light fluxes emitted from the light sources are condensed and are output as substantially parallel light fluxes, and a color combining optical element that receives the substantially parallel light fluxes from the condenser lenses at respective entry surfaces thereof and outputs the substantially parallel light fluxes as a combined light flux through an exit surface thereof;

an image forming unit that forms an image in a display area thereof;

a total reflection prism that, at an entry surface thereof, receives the combined light flux having exited the color combining optical element, totally reflects the received combined light flux at a total reflection surface thereof, outputs the totally reflected combined light flux through a first exit surface thereof so as to guide the totally reflected combined light flux to the display area of the image forming unit and outputs reflected light from the display area of the image forming unit through a second exit surface of the total reflection prism; and a projection lens that projects the reflected light output from the total reflection prism onto a projection surface, wherein:

at least one of the entry surfaces of the color combining optical element, the exit surface of the color combining optical element, and the entry surface of the total reflection prism, is formed as a free curved surface where a shape of a section of the combined light flux having entered the free curved surface is altered so as to match the shape of an outline of the display area, the light source unit is disposed so that an exiting light axis of the combined light flux output from the color combining optical element tilts by a predetermined angle relative to the display area of the image forming unit; and a smaller apex angle is formed by the first exit surface of the total reflection prism and the total reflection surface compared to an apex angle formed when the exiting light axis runs parallel to the display area of the image forming unit, the predetermined angle is set within a range between 10° and 11° and the smaller apex angle is set within a range between 31.5° and 32.5°.

5. The projection display device according to claim 4, wherein:

the predetermined angle is 10.59° and the smaller apex angle is 32°.

6. The projection display device according to claim 1, wherein:

the light sources emitting light fluxes in the plurality of colors are light sources that emit light fluxes in three different colors;

the image forming unit is a micro-mirror device; and the entry surface of the total reflection prism is the free curved surface.

7. The portable electronic apparatus comprising a projection display device according to claim 1.

8. The digital camera comprising a projection display device according to claim 1.

9. The projection display device according to claim 1, wherein:

the free curved surface condenses the light flux having entered the free curved surface.

* * * * *